United States Patent

Meguriya et al.

[11] Patent Number: 6,162,854
[45] Date of Patent: Dec. 19, 2000

[54] SILICONE RUBBER COMPOSITIONS FOR HIGH-VOLTAGE ELECTRICAL INSULATORS

[75] Inventors: Noriyuki Meguriya; Susumu Sekiguchi; Syuuichi Azechi; Takeo Yoshida, all of Usui-gun, Japan

[73] Assignee: Shin-Etsu Chemical, Co., Ltd., Japan

[21] Appl. No.: 09/031,691

[22] Filed: Feb. 27, 1998

[30] Foreign Application Priority Data

Feb. 28, 1997 [JP] Japan .................................... 9-062385

[51] Int. Cl.$^7$ .............................. C08K 3/22; C08K 5/24; C08L 83/04; C08F 130/08
[52] U.S. Cl. .................... 524/437; 524/731; 524/862; 524/266; 526/279; 528/31; 528/32
[58] Field of Search ...................... 524/862, 731, 524/437, 266; 526/279; 528/32, 31

[56] References Cited

U.S. PATENT DOCUMENTS

| | | | |
|---|---|---|---|
| 5,369,161 | 11/1994 | Kunieda et al. | 524/437 |
| 5,519,080 | 5/1996 | Matsushita et al. | 524/862 |
| 5,525,425 | 6/1996 | Fujioka et al. | 524/862 |
| 5,631,321 | 5/1997 | Okazaki et al. | 524/862 |
| 5,854,344 | 12/1998 | Shiono et al. | 524/862 |

FOREIGN PATENT DOCUMENTS 35982  4/1978  Japan .

OTHER PUBLICATIONS

JP 53035982—English abstract (Apr. 3, 1978).

*Primary Examiner*—Peter A. Szekely
*Attorney, Agent, or Firm*—Millen, White, Zelano, & Branigan, P.C.

[57] ABSTRACT

A silicone rubber composition contains (A) 100 parts by weight of an organopolysiloxane composition of the organic peroxide or addition reaction curing type, (B) 20–400 parts by weight of aluminum hydroxide, and (C) 1–20 parts by weight of an organopolysiloxane of formula (I): $R^1_a(OX)_b SiO_{(4-a-b)/2}$ wherein $R^1$ is a monovalent hydrocarbon group, at least 10 mol % of the $R^1$ groups being phenyl, X is hydrogen or a monovalent hydrocarbon group, a and b are positive numbers satisfying the range: $1.0 \leq a < 2.0$, $1 < a+b \leq 3$, and $0.001 \leq b/(a+b) \leq 0.8$. The composition cures into a silicone rubber having improved high-voltage electrical insulating properties even under humid conditions.

18 Claims, No Drawings

SILICONE RUBBER COMPOSITIONS FOR HIGH-VOLTAGE ELECTRICAL INSULATORS

BACKGROUND OF THE INVENTION

1. Field of the Invention

This invention relates to a silicone rubber composition which on heat curing provides silicone rubber serving as a high-voltage electrical insulator.

2. Prior Art

In general, high-voltage electrical insulating materials for use as insulators and bushings for power transmission lines are of porcelain or glass. Since these insulators are heavy and liable to breakage due to a lack of impact resistance, they require careful handling and impose a burden to workers. In a pollutive environment as in seaside areas and industrial areas, there is a tendency that dust, salts and mist attach to the surface of high-voltage electrical insulators, causing leakage currents and dry band discharge leading to flashover failure.

In order to eliminate the drawbacks of porcelain and glass insulators, a number of proposals have been made. For example, U.S. Pat. No. 3,511,698 discloses a weathering resistant high-voltage electrical insulator comprising a member of a thermosetting resin and a platinum catalyst-containing organopolysiloxane elastomer. JP-A 198604/1984 corresponding to U.S. Pat. No. 4,476,155 proposes a one-part room temperature curable organopolysiloxane composition which is applied to the outer surface of an electrical insulator of glass or porcelain so that the electrical insulator may maintain its high insulating properties even in the presence of moisture, air pollution, ultraviolet radiation and other outdoor stresses.

JP-A 35982/1978 corresponding to U.S. Pat. No. 3,965,065 discloses that a silicone rubber composition with improved electrical insulation is obtained by heating a mixture of an organopolysiloxane capable of heat curing into silicone rubber and aluminum hydroxide at temperatures above 100° C. for more than 30 minutes. JP-A 57574/1995 corresponding to U.S. Pat. No. 5,519,080 describes that the blending of a methylalkylsiloxane fluid in silicone rubber is effective for providing contact angle recovery with time and preventing flashover failure.

However, the silicone rubber materials used in the prior art techniques mentioned above are not yet fully satisfactory in high-voltage electrical insulation. They must be loaded with large amounts of aluminum hydroxide in order to improve the electrical insulation. This raises a new problem that on account of the moisture absorption of aluminum hydroxide itself, the silicone rubber loaded therewith has an increased moisture pickup and hence, a reduced electrical insulating capability under humid conditions.

SUMMARY OF THE INVENTION

Therefore, an object of the present invention is to provide a novel and improved silicone rubber composition loaded with aluminum hydroxide for use as high-voltage electrical insulators which cures into a silicone rubber having improved high-voltage electrical insulating properties even under humid conditions.

We have found that when a specific organopolysiloxane of formula (I) or a specific phenylsilane of formula (2), both defined later, is blended in an organopolysiloxane composition of the organic peroxide or addition reaction curing type containing aluminum hydroxide, the resulting composition heat cures into a silicone rubber having improved weathering resistance, stain resistance, voltage resistance, tracking resistance, arc resistance, and erosion resistance under conditions subject to air pollution or rigorous weather and even under humid conditions and thus serving as high-voltage electrical insulators.

In a first aspect, the present invention provides a silicone rubber composition for use as a high-voltage electrical insulator comprising (A) 100 parts by weight of an organopolysiloxane composition of the organic peroxide or addition reaction curing type, (B) about 20 to about 400 parts by weight of aluminum hydroxide, and (C) about 1 to about 20 parts by weight of an organopolysiloxane of the following average compositional formula (I):

$$R^1_a(OX)_b SiO_{(4-a-b)/2} \quad (I)$$

wherein $R^1$, which may be identical or different, is a substituted or unsubstituted monovalent hydrocarbon group, at least 10 mol % of the $R^1$ groups being phenyl, X, which may be identical or different, is hydrogen or a substituted or unsubstituted monovalent hydrocarbon group, letters a and b are positive numbers satisfying the range: $1.0 \leq a < 2.0$, $1 < a+b \leq 3$, and $0.001 \leq b/(a+b) \leq 0.8$.

Preferably component (C) is a thermoplastic silicone resin having a softening point of at least 50° C. When such a thermoplastic silicone resin is used as component (C), the silicone rubber composition is prepared by mixing component (C) with the entirety or part of components (A) and (B) for at least 15 minutes at a temperature not lower than the softening point of the silicone resin.

In a second aspect, the present invention provides a silicone rubber composition for use as a high-voltage electrical insulator comprising (D) 100 parts by weight of an organopolysiloxane composition of the organic peroxide or addition reaction curing type, (E) about 50 to about 600 parts by weight of aluminum hydroxide, and (F) about 1 to about 60 parts by weight of a phenylsilane of the following general formula (2):

$$PhSiX_3 \quad (2)$$

wherein Ph is a phenyl group, and X is a hydrolyzable group.

DETAILED DESCRIPTION OF THE INVENTION

First embodiment

In the silicone rubber composition according to the first embodiment of the invention, a first component or component (A) is an organopolysiloxane composition of the organic peroxide or addition reaction curing type.

The organopolysiloxane composition of the organic peroxide curing type (A) is preferably a silicone rubber composition comprising as main components, (a) an organopolysiloxane having on the average at least two alkenyl groups in a molecule of the following average compositional formula (II):

$$R^2_c SiO_{(4-c)/2} \quad (II)$$

wherein $R^2$ is a substituted or unsubstituted monovalent hydrocarbon group, 0.01 to 10 mol % of the $R^2$ groups being alkenyl, at least 90 mol % of the $R^2$ groups being methyl, and letter c is a positive number of 1.9 to 2.2, and (b) an organic peroxide.

The organopolysiloxane as component (a) is first described. In formula (II), $R^2$ is a substituted or unsubstituted monovalent hydrocarbon group, preferably having 1 to 12 carbon atoms, more preferably 1 to 8 carbon atoms. Examples include alkyl groups such as methyl, ethyl, propyl, isopropyl, butyl, isobutyl, tert-butyl, pentyl, hexyl, cyclohexyl and octyl; alkenyl groups such as vinyl, allyl, propenyl, isopropenyl, butenyl, and hexenyl; aryl groups such as phenyl, tolyl and naphthyl; aralkyl groups such as benzyl, phenylethyl and phenylpropyl; and substituted ones of these groups wherein some or all of the hydrogen atoms attached to carbon atoms are replaced by halogen atoms or cyano groups, such as chloromethyl, bromoethyl, 3,3,3-trifluoropropyl and cyanoethyl.

In formula (II), 0.01 to 10 mol %, preferably 0.02 to 1 mol % of the $R^2$ groups are alkenyl, and at least 90 mol %, preferably 95 to 99.99 mol % of the $R^2$ groups are methyl. The organopolysiloxane should have on the average at least two alkenyl groups in a molecule. If the alkenyl content is less than 0.01 mol %, the organopolysiloxane becomes gel due to insufficient crosslinking reaction, failing to provide the desired silicone rubber. Conversely, if the alkenyl content is more than 10 mol %, the organopolysiloxane becomes a non-stretching brittle rubber due to too many crosslinking sites. If the methyl content is less than 90 mol %, the organopolysiloxane becomes miscible with component (C) and prevents component (C) from exerting its own function. Letter c is a positive number in the range of 1.9 to 2.2, especially 1.95 to 2.05.

The organopolysiloxane of formula (II) may have a linear molecular structure or a branched molecular structure containing $R^2SiO_{3/2}$ and $R^2SiO_{4/2}$ units. Most often, it is a linear diorganopolysiloxane consisting essentially of diorganosiloxane units represented by $R^2{}_2SiO_{2/2}$ and blocked with a triorganosiloxy unit represented by $R^2{}_3SiO_{1/2}$ at each end of a molecular chain. At least two alkenyl groups which are contained in a molecule on the average may be attached to the silicon atom either at the end or at an intermediate of the molecular chain or both. From the standpoints of the strength and other physical properties of cured silicone rubber, the preferred diorganopolysiloxane should have an alkenyl group attached to the silicon atom at each end of the molecular chain.

Desirably the organopolysiloxane has an average degree of polymerization of 50 to 100,000, especially 100 to 20,000, and a viscosity of at least 100 centistokes at 25° C., 100 to 10,000,000 centistokes at 25° C., especially 500 to 1,000,000 centistokes at 25° C.

The organopolysiloxane can be prepared by well-known methods, for example, by effecting equilibration reaction between an organocyclopolysiloxane and a hexaorganodisiloxane in the presence of an alkali or acid catalyst.

The organic peroxide (b) is used as a catalyst for promoting crosslinking reaction of the organopolysiloxane (a). Any known organic peroxides are useful. Illustrative, non-limiting examples of the organic peroxide are given below.

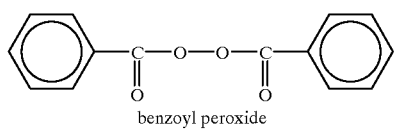
benzoyl peroxide

-continued

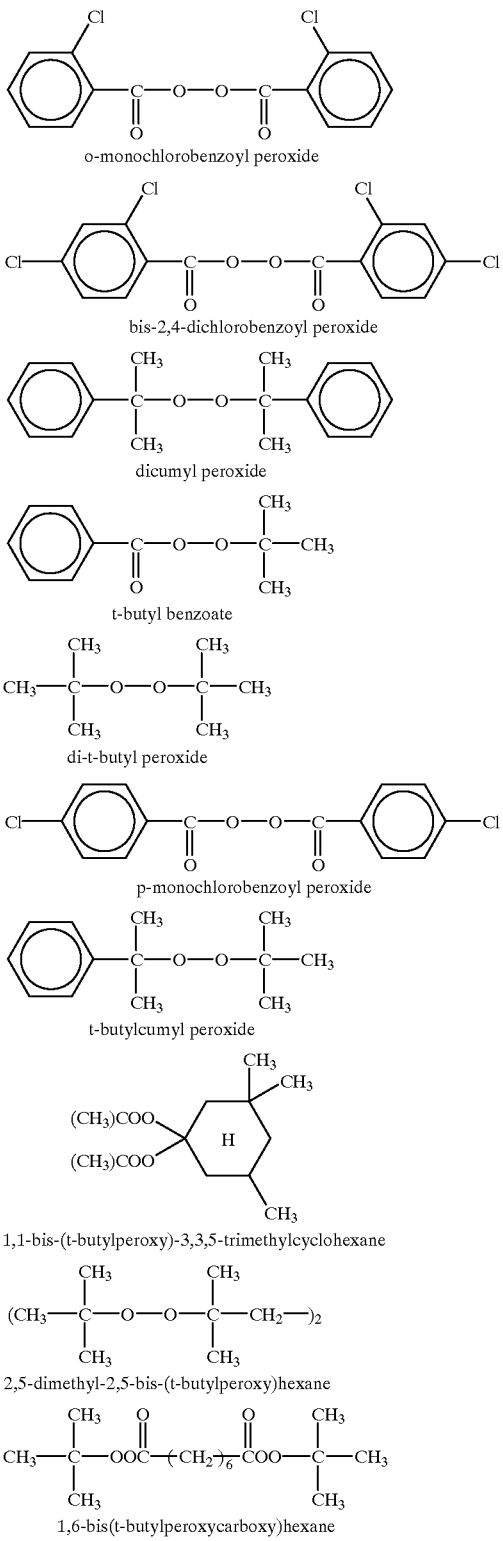

The amount of the organic peroxide blended is a catalytic amount and may be properly determined in accordance with the desired curing rate. Usually, about 0.1 to about 10 parts, preferably about 0.2 to about 2 parts by weight of the organic peroxide (b) is blended per 100 parts by weight of the organopolysiloxane (a).

To adjust the fluidity and/or to improve the mechanical strength of molded parts, inorganic fillers may be blended with components (a) and (b) insofar as the benefits of the invention are not impaired. Such inorganic fillers include reinforcing fillers such as precipitated silica, fumed silica, fired silica and fumed titanium oxide; and non-reinforcing fillers such as ground quartz, diatomaceous earth, asbestos, aluminosilicate, iron oxide, zinc oxide, and calcium carbonate. The fillers may be used as such or after surface treatment with organic silicon compounds such as hexamethylsilazane, trimethylchlorosilane, and polymethylsiloxane. An appropriate amount of the inorganic filler blended is 0 to about 500 parts, especially 0.1 to about 200 parts by weight per 100 parts by weight of component (a). If desired, pigments, heat resistance modifiers, flame retardants, and plasticizers may be blended although aluminum hydroxide is excluded.

The organopolysiloxane composition of the addition reaction curing type which is also used as component (A) is preferably one comprising as main components, (a) an organopolysiloxane having on the average at least two alkenyl groups in a molecule of the average compositional formula (II) defined above, (c) an organohydrogenpolysiloxane of the following average compositional formula (III):

$$R^3{}_eH_fSiO_{(4-e-f)/2} \qquad (III)$$

wherein $R^3$ is a substituted or unsubstituted monovalent hydrocarbon group having 1 to 10 carbon atoms, letter e is a positive number of 0.7 to 2.1, preferably 1 to 2, f is a positive number of 0.001 to 1.0, preferably 0.01 to 1.0, and the sum of e+f is from 0.8 to 3.0, preferably from 1 to 2.7, said organohydrogenpolysiloxane being liquid at room temperature, and (d) an addition reaction catalyst.

Component (a) is the same as the above-mentioned component (a) of the organopolysiloxane composition of the organic peroxide curing type.

With respect to component (c), $R^3$ in formula (III) is a substituted or unsubstituted monovalent hydrocarbon group having 1 to 10 carbon atoms, examples of which are the same as previously mentioned for $R^2$. Preferably, the hydrocarbon group represented by $R^3$ is free of an aliphatic unsaturated bond.

Examples of the organohydrogenpolysiloxane (c) include methylhydrogencyclosiloxanes, methylhydrogensiloxanedimethylsiloxane cyclic copolymers, both end trimethylsiloxy-blocked methylhydrogenpolysiloxanes, both end trimethylsiloxy-blocked dimethylsiloxanemethylhydrogensiloxane copolymers, both end dimethylhydrogensiloxy-blocked dimethylsiloxanes, both end dimethylhydrogensiloxy-blocked dimethylsiloxanemethylhydrogensiloxane copolymers, both end trimethylsiloxy-blocked methylhydrogensiloxane-diphenylsiloxane copolymers, both end trimethylsiloxy-blocked methylhydrogensiloxane-diphenylsiloxane-dimethylsiloxane copolymers, both end dimethylhydrogensiloxy-blocked dimethylsiloxane-methylhydrogensiloxane-diphenylsiloxane copolymers, both end dimethylhydrogensiloxy-blocked dimethylsiloxane-diphenylsiloxane copolymers, both end dimethylhydrogensiloxy-blocked methylhydrogensiloxane-diphenylsiloxane copolymers, copolymers consisting of $(CH_3)_2HSiO_{1/2}$ units and $SiO_{4/2}$ units, copolymers consisting of $(CH_3)_2HSiO_{1/2}$ units, $SiO_{4/2}$ units, and $(C_6H_5)SiO_{3/2}$ units, copolymers consisting of $(CH_3)_3SiO_{1/2}$ units, $(CH_3)_2HSiO_{1/2}$ units and $SiO_2$ units, and copolymers consisting of $(CH_3)HSiO_{2/2}$ units, and $(CH_3)SiO_{3/2}$ units and/or $HSiO_{3/2}$ units.

Preferably, the organohydrogenpolysiloxane is blended in an amount of about 0.1 to about 200 parts, more preferably about 0.1 to about 30 parts, especially about 0.3 to about 10 parts by weight per 100 parts by weight of the organopolysiloxane (a). Alternatively, the organohydrogenpolysiloxane may be blended in such amounts that about 0.5 to about 5 mol, preferably about 0.8 to about 3 mol of hydrogen atoms each attached to a silicon atom in its molecule (SiH groups) are available per mol of alkenyl groups in the organopolysiloxane (a).

The addition reaction catalyst (d) may be selected from platinum base catalysts such as platinum black, platinic chloride, chloroplatinic acid, reaction products of chloroplatinic acid with monohydric alcohols, complexes of chloroplatinic acid with olefins, and platinum bisacetoacetate, palladium base catalysts, and rhodium base catalysts. The amount of the addition reaction catalyst added is a catalytic amount and is usually from about 0.1 to 500 ppm, especially about 1 to 300 ppm of metallic platinum, palladium or rhodium based on the alkenyl-bearing organopolysiloxane (a) and organohydrogenpolysiloxane (c) combined.

To adjust the fluidity and/or to improve the mechanical strength of molded parts, inorganic fillers may be blended with components (a), (c) and (d) insofar as the benefits of the invention are not impaired. Such inorganic fillers include reinforcing fillers such as precipitated silica, fumed silica, fired silica and fumed titanium oxide; and non-reinforcing fillers such as ground quartz, diatomaceous earth, asbestos, aluminosilicate, iron oxide, zinc oxide, and calcium carbonate. The fillers may be used as such or after surface treatment with organic silicon compounds such as hexamethylsilazane, trimethylchlorosilane, and polymethylsiloxane. An appropriate amount of the inorganic filler blended is as previously described. If desired, pigments, heat resistance modifiers, flame retardants, and plasticizers may be blended although aluminum hydroxide is excluded.

A second component or component (B) in the silicone rubber composition according to the first embodiment of the invention is aluminum hydroxide which is effective for improving the electrical insulating properties, typically arc resistance and tracking resistance, of silicone rubber. It is essential for the composition of the invention.

Aluminum hydroxide is generally represented by the formula: $Al_2O_3.3H_2O$. Preferably aluminum hydroxide is in particulate form having a mean particle size of up to about 30 $\mu$m, especially about 0.5 to about 15 $\mu$m and a specific surface area of about 0.5 to 10 $m^2/g$ as measured by a BET method. The mean particle size may be measured as a weight average value by using a particle size distributor under a laser diffraction method. Aluminum hydroxide may be used as such or after surface treatment with suitable agents such as silane, silazane and titanate coupling agents, dimethylsiloxane oil, and stearic acid.

Component (B) or aluminum hydroxide is blended in an amount of about 20 to about 400 parts, preferably about 40 to about 300 parts by weight per 100 parts by weight of the organopolysiloxane composition (A). On this basis, compositions containing less than 20 parts of component (B) cure into products which are less improved in electrical insulation whereas compositions loaded with more than 400 parts of component (B) are difficult to handle because of increased viscosity and suffer from substantial losses of rubbery physical properties (e.g., strength, elongation and tear properties) and weathering resistance.

A third component or component (C) in the silicone rubber composition according to the first embodiment of the invention is an organopolysiloxane of the following average compositional formula (I).

$$R^1{}_a(OX)_b SiO_{(4-a-b)/2} \qquad (I)$$

This organopolysiloxane serves to cover the surface of aluminum hydroxide, thereby preventing any loss of electrical insulation in a humid environment.

In formula (I), $R^1$ is a substituted or unsubstituted monovalent hydrocarbon group, preferably having 1 to 12 carbon atoms, more preferably 1 to 8 carbon atoms while the $R^1$ groups may be identical or different. Exemplary hydrocarbon groups represented by $R^1$ are the same as previously described for $R^2$. At least 10 mol %, preferably 20 to 100 mol % of the $R^1$ groups must be phenyl. The organopolysiloxane with less than 10 mol % of phenyl fails to fully cover the surface of aluminum hydroxide. X is hydrogen or a substituted or unsubstituted monovalent hydrocarbon group, preferably having 1 to 6 carbon atoms, especially 1 to 3 carbon atoms while the X groups may be identical or different. Exemplary hydrocarbon groups represented by X are the same as previously described for $R^2$. Preferred examples include alkyl groups such as methyl, ethyl, propyl and isopropyl, alkoxy-substituted alkyl groups such as methoxyethyl and ethoxyethyl, aryl groups such as vinyl, allyl, propenyl and isopropenyl.

Letters a and b are positive numbers satisfying the range: $1.0 \leq a \leq 2.0$, preferably $1.2 \leq a \leq 1.8$, $1 < a+b < 3$, preferably $1.2 \leq a+b \leq 2.8$, and $0.001 \leq b/(a+b) \leq 0.8$, preferably $0.002 \leq b/(a+b) \leq 0.7$. If a is less than 1.0 or more than 2.0, the organopolysiloxane fails to effectively cover the surface of aluminum hydroxide. If b/(a+b) is less than 0.001, the organopolysiloxane fails to fixedly attach to the surface of aluminum hydroxide. If b/(a+b) is more than 0.8, the organopolysiloxane becomes unstable and will foam.

In one preferred embodiment, component (C) is a thermoplastic silicone resin of three-dimensional network structure having a softening point of at least 50° C., especially 60 to 150° C. and containing $R^1SiO_{3/2}$ and/or $SiO_2$ units in a molecule. Thermoplastic silicone resins having a softening point of lower than 50° C. would fail to fixedly attach to the surface of aluminum hydroxide, especially when the ambient temperature is high as in summer.

When a thermoplastic silicone resin having a softening point of at least 50° C. is used as component (C), better results are obtained by mixing component (C) with the entirety or part of components (A) and (B) for at least 15 minutes, especially 30 to 120 minutes at a temperature not lower than the softening point of the silicone resin.

An appropriate amount of component (C) blended is about 1 to about 20 parts, especially about 2 to about 10 parts by weight per 100 parts by weight of the organopolysiloxane composition (A). Less than 1 part of component (C) would fail to maintain electrical insulation in a humid environment whereas more than 20 parts of component (C) would lead to cured rubber having poor physical properties (mechanical strength etc.) and poor initial electrical properties.

Second embodiment

In the second embodiment of the invention, a silicone rubber composition for use as a high-voltage electrical insulator is defined as comprising (D) an organopolysiloxane composition of the organic peroxide or addition reaction curing type, (E) aluminum hydroxide, and (F) a phenylsilane of formula (2).

The organopolysiloxane composition of the organic peroxide curing type as the first component or component (D) is preferably a silicone rubber composition comprising as main components, (1) an organopolysiloxane of the following average compositional formula (1):

$$R^4{}_n SiO_{(4-n)/2} \qquad (1)$$

wherein $R^4$, which may be identical or different, is a substituted or unsubstituted monovalent hydrocarbon group, and letter n is a positive number of 1.98 to 2.02, (2) finely divided silica, and (3) an organic peroxide.

With respect to the organopolysiloxane as component (1), $R^4$ in formula (1) is a substituted or unsubstituted monovalent hydrocarbon group, preferably having 1 to 12 carbon atoms, more preferably 1 to 8 carbon atoms. Examples are the same as previously described for $R^2$.

Preferably in formula (1), 0.001 to 1 mol %, more preferably 0.005 to 0.5 mol % of the $R^4$ groups are alkenyl, and at least 90 mol %, more preferably 95 to 99.999 mol % of the $R^4$ groups are methyl. The organopolysiloxane should preferably have on the average at least two alkenyl groups (e.g., vinyl groups or allyl groups) in a molecule. The alkenyl groups may be attached to silicon atoms at an end and/or an intermediate of a molecular chain.

The organopolysiloxane of formula (1) is preferably end-blocked with a triorganosiloxy group represented by $R^4{}_3SiO_{1/2}$ such as a trimethylsiloxy, vinyldimethylsiloxy, methyldivinylsiloxy or trivinylsiloxy group. Most often, it is a linear diorganopolysiloxane having a backbone consisting essentially of recurring diorganosiloxane units represented by $R^4{}_2SiO_{2/2}$. A mixture of organopolysiloxanes with different molecular structures is also acceptable.

Desirably the organopolysiloxane has an average degree of polymerization of 50 to 100,000, especially 100 to 20,000, and a viscosity of at least 100 centistokes at 25° C., 100 to 10,000,000 centistokes at 25° C., especially 500 to 1,000,000 centistokes at 25° C.

A second component (2) is finely divided silica which is essential for providing silicone rubber with mechanical strength. To this end, finely divided silica should preferably have a specific surface area of at least about 50 m²/g, more preferably about 50 to 400 m²/g, especially about 100 to 300 m²/g as measured by the BET method. With a specific surface area of less than 50 m²/g, there would result a cured product having low mechanical strength. Examples of the reinforcing silica are fumed silica and precipitated silica. Also included are hydrophobic silicas obtained by surface treating these silicas with chlorosilanes, alkoxysilanes, silazanes, diorganocyclopolysiloxanes, and 1,3-disiloxane diols.

The reinforcing silica powder is preferably blended in an amount of about 1 to about 100 parts, more preferably about 30 to about 50 parts by weight per 100 parts by weight of the organopolysiloxane (1). Less than 1 part of silica would fail to achieve the desired reinforcement whereas organopolysiloxane compositions containing more than 100 parts of silica would be difficult to work and cure into silicone rubber having poor mechanical strength.

Component (3) is an organic peroxide which is the same as component (b) previously described in conjunction with the first embodiment of the invention. The amount of the organic peroxide blended is a catalytic amount and may be properly determined in accordance with the desired curing rate. An appropriate amount of the organic peroxide is about 0.1 to about 5 parts by weight per 100 parts by weight of the organopolysiloxane (1) or about 0.1 to about 3 parts by weight per 100 parts by weight of the organopolysiloxane composition (D).

The organopolysiloxane composition of the addition reaction curing type is preferably one comprising as main components, (1) 100 parts by weight of an organopolysiloxane of the average compositional formula (1), (2) about 1 to about 100 parts by weight of finely divided silica, and (4) about 0.1 to about 200 parts by weight of an organohydrogenpolysiloxane of the average compositional formula (III), and (5) a catalytic amount of an addition reaction catalyst.

Components (1) and (2) and their blended amounts are the same as the above-mentioned components (1) and (2) of the organic peroxide curing organopolysiloxane composition. The only difference is that in the addition reaction curing composition, an organopolysiloxane having on the average at least two alkenyl groups in a molecule must be used as component (1).

Components (4) and (5) are the same as the organohydrogenpolysiloxane as component (c) and the addition reaction catalyst as component (d) of the composition in the first embodiment. An appropriate amount of component (4) or organohydrogenpolysiloxane is about 0.1 to 200 parts, preferably about 0.1 to 30 parts, especially about 0.3 to 10 parts by weight per 100 parts by weight of the organopolysiloxane (1). Alternatively, the organohydrogenpolysiloxane (4) may be blended in such amounts that about 0.5 to about 5 mol, preferably about 0.8 to about 3 mol of hydrogen atoms each attached to a silicon atom in its molecule (SiH groups) are available per mol of alkenyl groups in the organopolysiloxane (1). The amount of the addition reaction catalyst (5) added is a catalytic amount and is usually from about 0.5 to 500 ppm, especially about 1 to 300 ppm of metallic platinum, palladium or rhodium based on the alkenyl-bearing organopolysiloxane (1) and organohydrogenpolysiloxane (3) combined.

A second component or component (E) of the composition according to the second embodiment is aluminum hydroxide. It is the same as the aluminum hydroxide of component (B) previously described in conjunction with the first embodiment. It is effective for improving the arc resistance and tracking resistance of silicone rubber.

Component (E) or aluminum hydroxide is blended in an amount of about 50 to about 600 parts, preferably about 100 to about 400 parts by weight per 100 parts by weight of the organopolysiloxane composition (D). On this basis, compositions containing less than 50 parts of component (E) cure into products which are less resistant to arc and tracking whereas loading of more than 600 parts of component (E) is difficult and adversely affects workability.

A third component or component (F) in the silicone rubber composition according to the second embodiment of the invention is a phenylsilane of the following general formula (2).

PhSiX$_3$ (2)

The blending of phenylsilane is effective for improving weathering resistance, tracking resistance and erosion resistance.

In formula (2), Ph is a phenyl group, and X is a hydrolyzable group, for example, a halogen atom such as chlorine or bromine, lower alkoxy group having 1 to 6 carbon atoms, preferably 1 to 3 carbon atoms, iminoxy group, acyloxy group, alkenyloxy group, aminoxy group, amino group, or dialkylamino group. Examples of the phenylsilane include phenyltrimethoxysilane, phenyltriethoxysilane, phenyltrimethylethylketoxyiminosilane, phenyltriacetoxysilane, phenyltrivinyloxysilane, and phenyltri(diethylamino)silane.

An appropriate amount of component (F) added is about 1 to about 60 parts, especially about 2 to about 30 parts by weight per 100 parts by weight of the organopolysiloxane composition (D). Outside this range, cured products achieve insufficient improvements in weathering resistance, tracking resistance, and erosion resistance.

In the composition of the second embodiment, optional components, for example, extending fillers such as ground quartz, diatomaceous earth and calcium carbonate may be added insofar as the benefits of the invention are not impaired. Other addenda including flame retardants, fire resistance modifiers, sensitizers, colorants, and heat resistance modifiers may be optionally added as well as reaction controlling agents, mold release agents and dispersants for fillers. Although alkoxysilanes, carbon functional silanes, and silanol group-containing low molecular weight siloxanes are typically used as the dispersants for fillers, their addition amount should be restricted to a minimal level so that the benefits of the invention may not be impaired.

The silicone rubber compositions according to the first and second embodiments of the invention are obtained by uniformly mixing the aforementioned components in a suitable rubber mixer such as a two roll mill, Banbury mixer or dough mixer (or kneader), followed by optional heat treatment. In the second embodiment, the organopolysiloxane as component (D-1) and the reinforcing silica as component (D-2) may be premixed to form a base compound, which is then mixed with the remaining components.

The silicone rubber compositions thus obtained are molded into desired silicone rubber parts by any desired molding technique such as casting, compression molding or extrusion molding.

EXAMPLE

Examples of the present invention are given below by way of illustration and not by way of limitation. All parts are by weight.

Preparation of silicone resins

A mixture of 70 mol % of phenyltrichlorosilane, 25 mol % of methyltrichlorosilane and 5 mol % of diphenyldichlorosilane was diluted with toluene. This dilution was added dropwise to a mixture of toluene, methyl ethyl ketone and water to effect hydrolysis. Hexamethyldisilazane was then added whereupon silylation was effected for 2 hours at 70° C. The volatiles were distilled off in vacuo, obtaining a thermoplastic silicone resin basically represented by the formula.

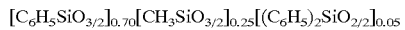

It had a softening point of 83° C. and contained 0.1 mol % of SiOH groups. It is designated Silicone Resin (A).

A mixture of 90 mol % methyltrichlorosilane and 10 mol % of dimethyldichlorosilane was diluted with toluene. This dilution was added dropwise to a mixture of toluene, isobutyl alcohol and water to effect hydrolysis. After water washing and neutralization with sodium hydrogen carbonate, the volatiles were distilled off in vacuo, obtaining a thermoplastic silicone resin basically represented by the formula.

It had a softening point of 75° C. and contained 0.2 mol % of SiOH groups. It is designated Silicone Resin (B).

Example 1

A kneader/mixer was charged with 80 parts of a dimethylpolysiloxane blocked with a dimethylvinylsiloxy group at each end of its molecular chain having a viscosity of 10,000 as at 25° C., 40 parts of fumed silica Aerosil 200 (Nippon Aerosil K.K.), 5 parts of hexamethyldisilazane, and 2 parts of water. The contents were agitated for one hour at room temperature (25° C.), the mixer was then heated to an internal temperature of 150° C., and agitation was continued for a further 3 hours, yielding a liquid silicone rubber base (C). To 30 parts of this liquid silicone rubber base (C) were added 80 parts of a dimethylpolysiloxane blocked with a dimethylvinylsiloxy group at each end of its molecular chain having a viscosity of 1,000 cs at 25° C., 120 parts of aluminum hydroxide Higilite H42-M (Showa Denko K.K.) and 8 parts of Silicone Resin (A). The mixture was mixed for 2 hours at 150° C. After cooling, 2.5 parts of methylhydrogenpolysiloxane (D) shown below, 0.1 part of a 1% isopropyl alcohol solution of chloroplatinic acid, and 0.05 part of ethynyl cyclohexanol as a reaction controlling agent were added to the mixture, which was uniformly mixed at room temperature, yielding a silicone rubber composition.

Methylhydrogenpolysiloxane (D)

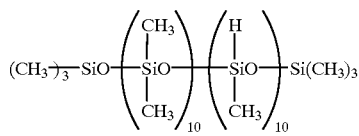

The composition was press molded at 150° C. for 10 minutes into silicone rubber sheets of 2 mm and 1 mm thick. The sheet of 2 mm thick was measured for physical properties according to JIS K6301. A test piece of 80 mm×80 mm cut out of the 2-mm sheet was measured for initial weight, immersed in pure water at 25° C. for 100 hours, and measured for weight again. A percent weight change is reported as percent water pickup in Table 1. The sheet of 1 mm thick was measured for initial volume resistance, dielectric constant, dielectric loss, and dielectric breakdown voltage according to JIS K6911, immersed in pure water at 25° C. for 100 hours, and measured for the same properties again. The results are shown in Table 1.

Example 2

A kneader/mixer was charged with 80 parts of a dimethylpolysiloxane blocked with a trivinylsiloxy group at each end of its molecular chain having a viscosity of 10,000 cs at 25° C., 40 parts of fumed silica Aerosil 200 (Nippon Aerosil K.K.), 5 parts of hexamethyldisilazane, and 2 parts of water. The contents were agitated for one hour at room temperature (25° C.), the mixer was then heated to an internal temperature of 150° C., and agitation was continued for a further 3 hours, yielding a liquid silicone rubber base (D). To 30 parts of this liquid silicone rubber base (D) were added 80 parts of a dimethylpolysiloxane blocked with a trivinylsiloxy group at each end of its molecular chain having a viscosity of 5,000 cs at 25°c, 120 parts of aluminum hydroxide Higilite® H42-M (Showa Denko K.K.) and 8 parts of Silicone Resin (A). The mixture was mixed for 2 hours at 150° C. After cooling, 0.7 part of t-butylperoxyisopropyl carbonate was added to the mixture, which was uniformly mixed at room temperature, yielding a silicone rubber composition. The composition was press molded at 170° C. for 10 minutes into silicone rubber sheets, which were measured for physical properties, water pickup, and electrical properties as in Example 1. The results are shown in Table 1.

Example 3

To 30 parts of the liquid silicone rubber base (C) of Example 1 were added 80 parts of a dimethylpolysiloxane blocked with a dimethylvinylsiloxy group at each end of its molecular chain having a viscosity of 1,000 cs at 25° C., 120 parts of aluminum hydroxide Higilite® H42-M (Showa Denko K.K.) and 7 parts of alkoxydisiloxane (E) shown below. The mixture was mixed for 2 hours at 150° C. After cooling, 2.5 parts of methylhydrogenpolysiloxane (D) used in Example 1, 0.1 part of a 1% isopropyl alcohol solution of chloroplatinic acid, and 0.05 part of ethynyl cyclohexanol as a reaction controlling agent were added to the mixture, which was uniformly mixed at room temperature, yielding a silicone rubber composition. The composition was press molded at 150° C. for 10 minutes into silicone rubber sheets, which were measured for physical properties, water pickup, and electrical properties as in Example 1. The results are shown in Table 1.

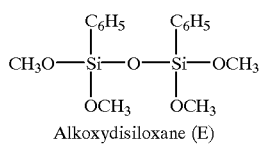

Alkoxydisiloxane (E)

Comparative Example 1

To 30 parts of the liquid silicone rubber base (C) of Example 1 were added 80 parts of a dimethylpolysiloxane blocked with a dimethylvinylsiloxy group at each end of its molecular chain having a viscosity of 1,000 cs at 25° C., 120 parts of aluminum hydroxide Higilite® H42-M (Showa Denko K.K.) and 8 parts of Silicone Resin (B). The mixture was mixed for 2 hours at 150° C. After cooling, 2.5 parts of methylhydrogenpolysiloxane (D) used in Example 1, 0.1 part of a 1% isopropyl alcohol solution of chloroplatinic acid, and 0.05 part of ethynyl cyclohexanol as a reaction controlling agent were added to the mixture, which was uniformly mixed at room temperature, yielding a silicone rubber composition. The composition was press molded at 150° C. for 10 minutes into silicone rubber sheets, which were measured for physical properties, water pickup, and electrical properties as in Example 1. The results are shown in Table 1.

Comparative Example 2

To 30 parts of the liquid silicone rubber base (C) of Example 1 were added 80 parts of a dimethylpolysiloxane blocked with a dimethylvinylsiloxy group at each end of its molecular chain having a viscosity of 1,000 cs at 25° C. and 120 parts of aluminum hydroxide Higilite® H42-M (Showa Denko K.K.). The mixture was mixed for 2 hours at 150° C. After cooling, 0.7 part of t-butylperoxyisopropyl carbonate was added to the mixture, which was uniformly mixed at room temperature, yielding a silicone rubber composition. The composition was press molded at 170° C. for 10 minutes into silicone rubber sheets, which were measured for physical properties, water pickup, and electrical properties as in Example 1. The results are shown in Table 1.

Comparative Example 3

To 30 parts of the liquid silicone rubber base (C) of Example 1 were added 80 parts of a dimethylpolysiloxane blocked with a dimethylvinylsiloxy group at each end of its molecular chain having a viscosity of 1,000 cs at 25° C. and 120 parts of aluminum hydroxide Higilite® H42-M (Showa Denko K.K.). The mixture was mixed for 2 hours at 150° C. After cooling, 2.5 parts of methylhydrogenpolysiloxane (D)

used in Example 1, 0.1 part of a 1% isopropyl alcohol solution of chloroplatinic acid, and 0.05 part of ethynyl cyclohexanol as a reaction controlling agent were added to the mixture, which was uniformly mixed at room temperature, yielding a silicone rubber composition. The composition was press molded at 150° C. for 10 minutes into silicone rubber sheets, which were measured for physical properties, water pickup, and electrical properties as in Example 1. The results are shown in Table 1.

Comparative Example 4

To 30 parts of the liquid silicone rubber base (C) of Example 1 were added 80 parts of a dimethylpolysiloxane blocked with a dimethylvinylsiloxy group at each end of its molecular chain having a viscosity of 1,000 cs at 25° C., 120 parts of aluminum hydroxide Higilite H42-M (Showa Denko K.K.) and 7 parts of diphenylsilane diol shown below. The mixture was mixed for 2 hours at 150° C. After cooling, 2.5 parts of methylhydrogenpolysiloxane (D) used in Example 1, 0.1 part of a 1% isopropyl alcohol solution of chloroplatinic acid, and 0.05 part of ethynyl cyclohexanol as a reaction controlling agent were added to the mixture, which was uniformly mixed at room temperature, yielding a silicone rubber composition. The composition was press molded at 150° C. for 10 minutes into silicone rubber sheets, which were measured for physical properties, water pickup, and electrical properties as in Example 1. The results are shown in Table 1.

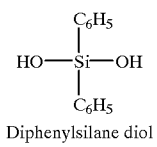

Diphenylsilane diol

Example 4

Compound 1 was prepared by blending 100 parts of organopolysiloxane gum A consisting of 99.825 mol % of dimethylsiloxane units, 0.15 mol % of methylvinylsiloxane units, and 0.025 mol % of dimethylvinylsiloxy units and having an average degree of polymerization of about 8,000 with 5 parts of a both end silanol group-blocked dimethylpolysiloxane (average degree of polymerization 10) as a dispersant, 10 parts of fumed silica having a specific surface area of 200 $m^2$/g (Nippon Aerosil K.K.), 160 parts of aluminum hydroxide Higilite® H42-M (Showa Denko K.K.), and 5 parts of phenyltrimethoxysilane, and heat treating the blend at 150° C. for 3 hours.

To Compound 1 was added 1.0 part of a 40% paste of 2,5-dimethyl-bis(2,5-t-butylperoxy)hexane/the above-mentioned organopolysiloxane A/fumed silica having a specific surface area of 200 $m^2$/g (Nippon Aerosil K.K.). The ingredients were uniformly dispersed in a twin roll mill. The composition was then press cured at 165° C. for 10 minutes, obtaining silicone rubber sheets of 2 mm and 1 mm thick.

The sheet of 2 mm thick was measured for physical properties according to JIS K6301. A test piece of 80 mm x 80 mm cut out of the 2-mm sheet was measured for initial weight, immersed in deionized water at 25° C. for 100 hours, and measured for weight again. A percent weight change is reported as water pickup in Table 2. The sheet of 1 mm thick was measured for initial volume resistance, dielectric constant, dielectric loss, and dielectric breakdown voltage according to JIS K6911, immersed in deionized water at 25° C. for 100 hours, and measured for the same properties again. The results are shown in Table 2.

Example 5

Compound 2 was prepared by blending 100 parts of organopolysiloxane gum A consisting of 99.825 mol % of dimethylsiloxane units, 0.15 mol % of methylvinylsiloxane units, and 0.025 mol % of dimethylvinylsiloxy units and

TABLE 1

|  | Example | | | Comparative Example | | | |
| --- | --- | --- | --- | --- | --- | --- | --- |
|  | 1 | 2 | 3 | 1 | 2 | 3 | 4 |
| Hardness (JIS A) | 65 | 68 | 66 | 63 | 68 | 62 | 66 |
| Tensile strength (kgf/$cm^2$) | 28 | 24 | 25 | 22 | 25 | 27 | 24 |
| Elongation (%) | 180 | 120 | 170 | 190 | 130 | 210 | 150 |
| Initial properties | | | | | | | |
| Volume resistivity ($\Omega \cdot cm$) | $6.1 \times 10^{13}$ | $8.5 \times 10^{13}$ | $2.0 \times 10^{13}$ | $1.6 \times 10^{14}$ | $2.0 \times 10^{14}$ | $3.4 \times 10^{14}$ | $1.2 \times 10^{13}$ |
| Breakdown voltage (kV/mm) | 28 | 27 | 29 | 28 | 28 | 28 | 26 |
| Dielectric constant @ 60 Hz | 3.8 | 4.1 | 3.9 | 3.8 | 3.8 | 3.9 | 4.0 |
| Dielectric loss @ 60 Hz | 0.037 | 0.041 | 0.043 | 0.035 | 0.038 | 0.032 | 0.044 |
| After water immersion | | | | | | | |
| Water pickup (%) | 0.19 | 0.22 | 0.28 | 0.65 | 0.71 | 0.85 | 0.52 |
| Volume resistivity ($\Omega \cdot cm$) | $5.4 \times 10^{13}$ | $4.2 \times 10^{13}$ | $1.5 \times 10^{13}$ | $2.3 \times 10^{12}$ | $6.8 \times 10^{11}$ | $1.8 \times 10^{11}$ | $4.1 \times 10^{12}$ |
| Breakdown voltage (kV/mm) | 27 | 27 | 27 | 14 | 13 | 9 | 19 |
| Dielectric constant @ 60 Hz | 3.9 | 4.3 | 4.2 | 7.2 | 7.4 | * | 6.9 |
| Dielectric loss @ 60 Hz | 0.053 | 0.058 | 0.060 | 0.102 | 0.123 | * | 0.099 |

*above the measurement limit having an average degree of polymerization of about 8,000 with 5 parts of a both end silanol group-blocked dimethylpolysiloxane (average degree of polymerization 10) as a dispersant, 10 parts of fumed silica having a specific surface area of 200 m$^2$/g (Nippon Aerosil K.K.), 160 parts of aluminum hydroxide Higilite® H42-M (Showa Denko K.K.), and 5 parts of phenyltridiethylaminosilane, and heat treating the blend at 150° C. for 3 hours.

To Compound 2 was added 1.0 part of a 40% paste of 2,5-dimethyl-bis(2,5-t-butylperoxy)hexane/the above-mentioned organopolysiloxane A/fumed silica having a specific surface area of 200 m$^2$/g (Nippon Aerosil K.K.). The ingredients were uniformly dispersed in a twin roll mill. The composition was then press cured at 165° C. for 10 minutes, obtaining silicone rubber sheets.

The rubber sheets were measured for physical properties, water pickup, and electrical properties before and after water immersion as in Example 4. The results are shown in Table 2.

Example 6

Compound 3 was prepared by blending 100 parts of organopolysiloxane gum A consisting of 99.825 mol % of dimethylsiloxane units, 0.15 mol % of methylvinylsiloxane units, and 0.025 mol % of dimethylvinylsiloxy units and having an average degree of polymerization of about 8,000 with 5 parts of a both end silanol group-blocked dimethylpolysiloxane (average degree of polymerization 10) as a dispersant, 10 parts of fumed silica having a specific surface area of 200 m$^2$/g (Nippon Aerosil K.K.), 160 parts of aluminum hydroxide Higilite® H42-M (Showa Denko K.K.), and 5 parts of a hydrolyzate of phenyltrichlorosilane, and heat treating the blend at 150° C. for 3 hours.

To Compound 3 was added 1.0 part of a 40% paste of 2,5-dimethyl-bis(2,5-t-butylperoxy)hexane/the above-mentioned organopolysiloxane A/fumed silica having a specific surface area of 200 m$^2$/g (Nippon Aerosil K.K.). The ingredients were uniformly dispersed in a twin roll mill. The composition was then press cured at 165° C. for 10 minutes, obtaining silicone rubber sheets.

The rubber sheets were measured for physical properties, water pickup, and electrical properties before and after water immersion as in Example 4. The results are shown in Table 2.

Comparative Example 5

Compound 4 was prepared by blending 100 parts of organopolysiloxane gum A consisting of 99.825 mol % of dimethylsiloxane units, 0.15 mol % of methylvinylsiloxane units, and 0.025 mol % of dimethylvinylsiloxy units and having an average degree of polymerization of about 8,000 with 5 parts of a both end silanol group-blocked dimethylpolysiloxane (average degree of polymerization 10) as a dispersant, 10 parts of fumed silica having a specific surface area of 200 m$^2$/g (Nippon Aerosil K.K.), and 160 parts of aluminum hydroxide Higilite® H42-M (Showa Denko K.K.), and heat treating the blend at 150° C. for 3 hours.

To Compound 4 was added 1.0 part of a 40% paste of 2,5-dimethyl-bis(2,5-t-butylperoxy)hexane/the above-mentioned organopolysiloxane A/fumed silica having a specific surface area of 200 m$^2$/g (Nippon Aerosil K.K.). The ingredients were uniformly dispersed in a twin roll mill. The composition was then press cured at 165° C. for 10 minutes, obtaining silicone rubber sheets.

The rubber sheets were measured for physical properties, water pickup, and electrical properties before and after water immersion as in Example 4. The results are shown in Table 2.

Comparative Example 6

Compound 5 was prepared by blending 100 parts of organopolysiloxane gum A consisting of 99.825 mol % of dimethylsiloxane units, 0.15 mol % of methylvinylsiloxane units, and 0.025 mol % of dimethylvinylsiloxy units and having an average degree of polymerization of about 8,000 with 5 parts of a both end silanol group-blocked dimethylpolysiloxane (average degree of polymerization 10) as a dispersant, 10 parts of fumed silica having a specific surface area of 200 m$^2$/g (Nippon Aerosil K.K.), 160 parts of aluminum hydroxide Higilite® H42-M (Showa Denko K.K.), and 5 parts of methyltrimethoxysilane, and heat treating the blend at 150° C. for 3 hours.

To Compound 5 was added 1.0 part of a 40% paste of 2,5-dimethyl-bis(2,5-t-butylperoxy)hexane/the above-mentioned organopolysiloxane A/fumed silica having a specific surface area of 200 m$^2$/g (Nippon Aerosil K.K.). The ingredients were uniformly dispersed in a twin roll mill. The composition was then press cured at 165° C. for 10 minutes, obtaining silicone rubber sheets.

The rubber sheets were measured for physical properties, water pickup, and electrical properties before and after water immersion as in Example 4. The results are shown in Table 2.

Example 7

To 30 parts of the liquid silicone rubber base (C) of Example 1 were added 80 parts of a dimethylpolysiloxane blocked with a dimethylvinylsiloxy group at each end of its molecular chain having a viscosity of 1,000 cs at 25° C., 120 parts of aluminum hydroxide Higilite® H42-M (Showa Denko K.K.) and 7 parts of phenyltrimethoxysilane. The mixture was mixed for 2 hours at 150° C. After cooling, 2.5 parts of methylhydrogenpolysiloxane (D) used in Example 1, 0.1 part of a 1% isopropyl alcohol solution of chloroplatinic acid, and 0.05 part of ethynyl cyclohexanol as a reaction controlling agent were added to the mixture, which was uniformly mixed at room temperature, yielding a silicone rubber composition. The composition was press molded at 150° C. for 10 minutes into silicone rubber sheets, which were measured for physical properties, water pickup, and electrical properties as in Example 4. The results are shown in Table 2.

TABLE 2

| | Example | | | | Comparative Example | |
|---|---|---|---|---|---|---|
| | 4 | 5 | 6 | 7 | 5 | 6 |
| Hardness (JIS A) | 62 | 58 | 59 | 65 | 60 | 60 |
| Tensile strength (kgf/cm$^2$) | 25 | 20 | 22 | 25 | 20 | 18 |
| Elongation (%) | 200 | 220 | 200 | 170 | 200 | 250 |
| Initial properties | | | | | | |
| Volume resistivity ($\Omega \cdot$ cm) | $4.6 \times 10^{14}$ | $3.2 \times 10^{14}$ | $8.3 \times 10^{13}$ | $5.0 \times 10^{13}$ | $3.8 \times 10^{14}$ | $4.3 \times 10^{14}$ |
| Breakdown voltage (kV/mm) | 29 | 28 | 28 | 29 | 29 | 29 |
| Dielectric constant @ 60 Hz | 4.0 | 4.3 | 4.4 | 4.1 | 3.8 | 3.9 |
| Dielectric loss @ 60 Hz | 0.0380 | 0.045 | 0.058 | 0.040 | 0.043 | 0.040 |
| After water immersion | | | | | | |
| Water pickup (%) | 0.28 | 0.35 | 0.41 | 0.27 | 0.60 | 0.70 |
| Volume resistivity ($\Omega \cdot$ cm) | $8.3 \times 10^{13}$ | $2.2 \times 10^{13}$ | $1.3 \times 10^{13}$ | $2.0 \times 10^{13}$ | $4.2 \times 10^{8}$ | $2.1 \times 10^{8}$ |
| Breakdown voltage (kV/mm) | 27 | 26 | 25 | 27 | 7 | 6 |
| Dielectric constant @ 60 Hz | 4.95 | 5.23 | 5.22 | 4.60 | UM | UM |
| Dielectric loss @ 60 Hz | 0.078 | 0.075 | 0.098 | 0.061 | UM | UM |

UM: unmeasurable

It is evident that silicone rubber compositions according to the invention cure into silicon rubbers which are improved in high-voltage electrical properties under humid conditions and thus suited for high-voltage insulators.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A silicone rubber composition for use as a high-voltage electrical insulator comprising (A) 100 parts by weight of an organic peroxide- or addition reaction-curing organopolysiloxane composition which, if it is an addition reaction-curing organopolysiloxane composition, contains alkenyl groups, (B) 20 to 400 parts by weight of aluminum hydroxide, and (C) 1 to 20 parts by weight of an organopolysiloxane of the following average compositional formula (I):

$$R^1{}_a(OX)_b SiO_{(4-a-b)/2} \qquad (I)$$

wherein $R^1$, which may be identical or different, is a substituted or unsubstituted monovalent hydrocarbon group, at least 10 mol % of the $R^1$ groups being phenyl, X which may be identical or different, is hydrogen or a substituted or unsubstituted monovalent hydrocarbon group, letters a and b are positive numbers satisfying the range: $1.0 \leq a < 2.0$, $1 < a+b \leq 3$, and $0.001 \leq b/(a+b) \leq 0.8$, said organopolysiloxane of component (C) being:

a thermoplastic silicone resin of three-dimensional network structure containing $R^1 SiO_{3/2}$ and $SiO_2$ units wherein $R^1$ is as defined above and having a softening point of at least 50° C., or a disiloxane of the formula:

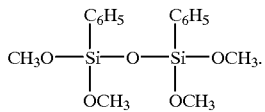

2. The silicone rubber composition of claim 1 wherein said organopolysiloxane composition (A) is an organic peroxide-curing composition which comprises as main components, (A) 100 parts by weight of an organopolysiloxane having on the average at least two alkenyl groups in a molecule of the following average compositional formula (II):

$$R^2{}_c SiO_{(4-c)/2} \qquad (II)$$

wherein $R^2$, is a substituted or unsubstituted monovalent hydrocarbon group, 0.01 to 10 mol % of the $R^2$ groups being alkenyl, at least 90 mol % of the $R^2$ groups being methyl, and letter c is a positive number of 1.9 to 2.2, and (b) a catalytic amount of an organic peroxide.

3. The silicone rubber composition of claim 1 wherein said organopolysiloxane composition (A) is an addition reaction-curing composition which comprises as main components, (a) 100 parts by weight of an organopolysiloxane having on the average at least two alkenyl groups in a molecule of the following average compositional formula (II):

$$R^2{}_c SiO_{(4-c)/2} \qquad (II)$$

wherein $R^2$ is a substituted or unsubstituted monovalent hydrocarbon group, 0.01 to 10 mol % of the $R^2$ groups being alkenyl, at least 90 mol % of the $R^2$ groups being methyl, and letter c is a positive number of 1.9 to 2.2, (c) 0.1 to 200 parts by weight of an organopolysiloxane of the following average compositional formula (III):

$$R^3{}_e H_f SiO_{(4-e-f)/2} \tag{III}$$

wherein $R^3$ is a substituted or unsubstituted monovalent hydrocarbon group having 1 to 10 carbon atoms, letter e is a positive number of 0.7 to 2.1, f is a positive number of 0.001 to 1.0, and the sum of e+f is from 0.8 to 3.0, said organohydrogenpolysiloxane being liquid at room temperature, and (d) a catalytic amount of an addition reaction catalyst.

4. A method for preparing the silicone rubber composition of claim 1 wherein component (C) is a thermoplastic silicone resin having a softening point of at least 50° C., said method comprising the step of mixing component (C) with the entirety or part of components (A) and (B) for at least 15 minutes at a temperature not lower than the softening point of said silicone resin.

5. A silicone rubber composition for use as a high-voltage electrical insulator comprising (D) 100 parts by weight of an organic peroxide- or addition reaction-curing organopolysiloxane composition which, if it is an addition reaction-curing composition, contains alkenyl groups, (E) 50 to 600 parts by weight of aluminum hydroxide, and (F) 1 to 60 parts by weight of a phenylsilane of the formula (2):

$$PhSiX_3 \tag{2}$$

wherein Ph is a phenyl group, and X is a hydrolyzable group.

6. The silicone rubber composition of claim 5 wherein said organopolysiloxane composition (D) is an organic peroxide-curing composition which comprises as main components, (1) 100 parts by weight of an organo polysiloxane of the following average compositional formula (1):

$$R^4{}_n SiO_{(4-n)/2} \tag{1}$$

wherein $R^4$, which may be identical or different, is a substituted or unsubstituted monovalent hydrocarbon group, and letter n is a positive number of 1.98 to 2.02, (2) 1 to 100 parts by weight of finely divided silica, and (3) a catalytic amount of an organic peroxide.

7. The silicone rubber composition of claim 5 wherein said organopolysiloxane composition (D) is an addition reaction curing composition which comprises as main components, (1) 100 parts by weight of an organopolysiloxane having on the average at least two alkenyl groups in a molecule of the following average compositional formula (1):

$$R^4{}_n SiO_{(4-n)/2} \tag{1}$$

wherein $R^4$, which may be identical or different, is a substituted or unsubstituted monovalent hydrocarbon group, and letter n is a positive number of 1.98 to 2.02, (2) 1 to 100 parts by weight of finely divided silica, and (4) 0.1 to 200 parts by weight of an organohydrogenpolysiloxane of the following average compositional formula (III):

$$R^3{}_e H_f SiO_{(4-e-f)/2} \tag{III}$$

wherein $R^3$ is a substituted or unsubstituted monovalent hydrocarbon group having 1 to 10 carbon atoms, letter e is a positive number of 0.7 to 2.1, f is a positive number of 0.001 to 1.0, and the sum of e+f is from 0.8 to 3.0, and (5) a catalytic amount of an addition reaction catalyst.

8. The silicone rubber composition of claim 2, wherein the organopolysiloxane (A) is a diorganopolysiloxane having an alkenyl group attached to a silicon atom at each end of its molecular chain and has an average degree of polymerization of 50 to 100,000.

9. The silicone rubber composition of claim 3, wherein the organopolysiloxane (A) is a diorganopolysiloxane having an alkenyl group attached to a silicon atom at each end of its molecular chain and has an average degree of polymerization of 50 to 100,000.

10. The silicone rubber composition of claim 6, wherein the organopolysiloxane of formula (1) is a diorganopolysiloxane having an alkenyl group attached to a silicon atom at each end of its molecular chain and has an average degree of polymerization of 50 to 100,000.

11. The silicone rubber composition of claim 7, wherein the organopolysiloxane of formula (1) is a diorganopolysiloxane having an alkenyl group attached to a silicon atom at each end of its molecular chain and has an average degree of polymerization of 50 to 100,000.

12. The silicone rubber composition of claim 1, wherein the aluminum hydroxide (B) is in particulate form having a mean particle size of about 0.5 to about 30 μm and a specific surface area of about 0.5 to 10 $m^2/g$.

13. The silicone rubber composition of claim 6, wherein the aluminum hydroxide (B) is in particulate form having a mean particle size of about 0.5 to about 30 μm and a specific surface area of about 0.5 to 10 $m^2/g$.

14. The silicone rubber composition of claim 1, wherein the aluminum hydroxide (B) is surface treated with a silane, silazane, titanate coupling, dimethylsilicone oil or stearic acid agent.

15. The silicone rubber composition of claim 6, wherein the aluminum hydroxide (B) is surface treated with a silane, silazane, titanate coupling, dimethylsilicone oil or stearic acid agent.

16. The silicone rubber composition of claim 1, wherein component (C) is a thermoplastic silicone resin of three-dimensional network structure having a softening point of 60 to 150° C. and containing $R^1 SiO_{3/2}$ and/or $SiO_2$ units in a molecule.

17. The silicone rubber composition of claim 1, wherein component (C) is provided in an amount of 2 to 10 parts by weight per 100 parts by weight of the organopolysiloxane composition (A).

18. The silicone rubber composition of claim 5, wherein in formula (2), X is a halogen atom, lower alkoxy group of 1 to 6 carbon atoms, iminoxy group, acyloxy group, alkenyloxy group, aminoxy group, amino group or dialkylamino group.

* * * * *